(12) United States Patent
Gavin

(10) Patent No.: US 9,571,961 B2
(45) Date of Patent: Feb. 14, 2017

(54) SYSTEMS AND METHODS FOR TRANSIT-RIDER-STATUS IDENTIFICATION AND COMMUNICATION

(71) Applicant: Trapeze Software ULC, Mississauga (CA)

(72) Inventor: David Gavin, Dundas (CA)

(73) Assignee: TRAPEZE SOFTWARE ULC, Mississauga (CA)

(*) Notice: Subject to any disclaimer, the term of this patent is extended or adjusted under 35 U.S.C. 154(b) by 0 days.

(21) Appl. No.: 14/568,302

(22) Filed: Dec. 12, 2014

(65) Prior Publication Data

US 2016/0174024 A1    Jun. 16, 2016

(51) Int. Cl.
*H04W 4/02* (2009.01)
*G06Q 50/30* (2012.01)

(52) U.S. Cl.
CPC ............... *H04W 4/02* (2013.01); *G06Q 50/30* (2013.01)

(58) Field of Classification Search
CPC ........... H04W 4/02; G06Q 50/30; G01C 21/20
See application file for complete search history.

(56) References Cited

U.S. PATENT DOCUMENTS

| | | | |
|---|---|---|---|
| 2006/0009905 A1* | 1/2006 | Soderberg | B61L 15/0045 701/532 |
| 2007/0034107 A1* | 2/2007 | Barbeau | G01C 21/20 104/307 |

* cited by examiner

*Primary Examiner* — Kristy A Haupt
(74) *Attorney, Agent, or Firm* — Elan IP Inc.

(57) ABSTRACT

Systems and methods for transit-rider-status determination and communication where a rider, via their rider communication device may provide their status to one or more transit agencies or transit networks to avail themselves of communication services that are catered to them and to their status.

5 Claims, 5 Drawing Sheets

SYSTEMS AND METHODS FOR TRANSIT-RIDER-STATUS IDENTIFICATION AND COMMUNICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Transit agencies have long sought to provide information about transit services to transit riders. This started as signs at bus stops, to schedules as bus stops and then to schedules and arrival times (estimated and schedules) that were available at bus stops, online, and on mobile computing devices. Transit riders have truly benefited from greater access to transit agency data.

What has remained unsolved is transit agencies benefiting from greater access to transit rider data. Transit agencies do not know the rider-status of their riders—are the riders at home, walking to a bus stop, in a new city, at a bus stop, on a bus, waiting for a transfer, etc. Sometimes a transit agency may know a trip that a transit rider is planning (although often this trip planning is anonymous) but they do not know specific progress throughout the trip or any status for trips that are not planned via trip planning technologies.

There thus remains a need for rider-status information to be obtained by transit agencies—and further to facilitate new and improved communication and exchange of transit data between transit agencies and transit riders.

SUMMARY OF THE INVENTION

There is a method for communication between one or more transit riders and one or more transit agencies via one or more elements of the one or more transit agencies, where such communication is determined by a transit-rider-status and where elements comprise at least one of vehicles having one or more mobile data terminals thereon, vehicle stops, and communication servers, the method comprising obtaining, by at least one element of the one or more transit agencies, the transit-rider-status, obtaining the communication settings relating to the transit-rider-status, communicating with the rider based on the communication settings.

The obtaining may further comprise receiving a transit-rider-status indicator; and determining a transit-rider-status from the transit-rider-status indicator.

The transit-rider-status indicator may be at least one of a rider GPS location and a rider-input transit-rider-status accepted by the rider communication device.

The obtaining may be via a local communication between a rider communication device and a transit agency element.

The transit agency element may be a mobile data terminal, the transit-rider-status indicator may be a rider GPS location, the local communication may be via a vehicle area network, and the determining may further comprise comparing the rider GPS location to a mobile data terminal GPS location.

The rider communication device may be configured to: automatically send transit-rider-status indicators, when an automatic mode is enabled, according to one or more transit-rider-status indicator rules; and receive from a rider a rider-input transit-rider-status and send the rider-input transit-rider-status.

The method may further comprise providing the transit-rider-status to other transit agency elements.

There is also a transit system for communication between one or more transit users and one or more transit agency elements of one or more transit agencies, where such communication is determined by transit-rider-status and where transit agency elements comprise transit industry vehicles, transit stops, and transit agency servers, the system comprising one or more transit agency servers for one or more transit agencies configured to receive one or more transit-rider-status indicators, determine a transit-rider-status for each of the one or more transit users, exchange the transit-rider-status and other transit data with one or more interested elements; and communicate with and provide transit agency services to the one or more user computing devices; and one or more mobile data terminals each located on a transit industry vehicle, each configured to receive one or more transit-rider-status indicators from one or more rider communication devices, determine a transit-rider-status for each of the one or more transit users, exchange the transit-rider-status and other transit data with one or more interested elements, and communicate with and provide transit agency services to the one or more rider computing devices.

There is further a computer program product, comprising a computer usable medium having a computer readable program code adapted to be executed on a rider communication device to cause the rider communication device to communicate with one or more transit agency elements of one or more transit agencies where such communication is determined by a transit-rider-status, the method comprising detecting one or more transit agencies relevant to the rider communication device, providing one or more transit-rider-status indicators to one or more transit agency elements to enable a transit-rider-status to be determined, receiving transit agency data from one or more transit agency elements in accordance with the transit-rider-status.

The providing may further comprise getting, automatically and according to one or more transit-rider-status indicator rules, transit-rider-status indicators when an automatic mode is enabled, enabling receipt, from a rider, a rider-input transit-rider-status; and sending, if they exist, the transit-rider-status indicators and the rider-input transit-rider-status.

The transit-rider-status indicator may be at least one of a rider GPS location and a rider-input transit-rider-status accepted by the rider communication device.

The detecting, providing and receiving are via a local communication with one or more transit agency elements.

The transit agency element may be a vehicle mobile data terminal, the transit-rider-status indicator may be a rider GPS location, the local communication may be via a vehicle area network, and the determining may further comprise comparing the rider GPS location to a mobile data terminal GPS location.

There is also a computer program product, comprising a computer usable medium having a computer readable program code adapted to be executed on a rider communication device (RCD) of a rider to cause the rider communication device to register and communicate with a mobile data terminal (MDT) of a transit vehicle the method comprising registering the RCD with the MDT of the transit vehicle, establishing what communications are to occur between the MDT and the RCD, providing, by the RCD to the MDT, rider communication device data, and receiving, by the RCD from the MDT, mobile data terminal data.

The rider communication device data may be a route being taken by the rider, such route including one or more legs where a current leg may be performed by the transit industry vehicle, and the current leg having an endpoint that may be a transit stop for the transit industry vehicle, and wherein the mobile data terminal data may be a next stop announcement when a next stop of transit vehicle is the endpoint.

The registering may further comprise ensuring the RCD is travelling on the MDT. The ensuring may be via comparing a rider GPS location to a mobile data terminal GPS location.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
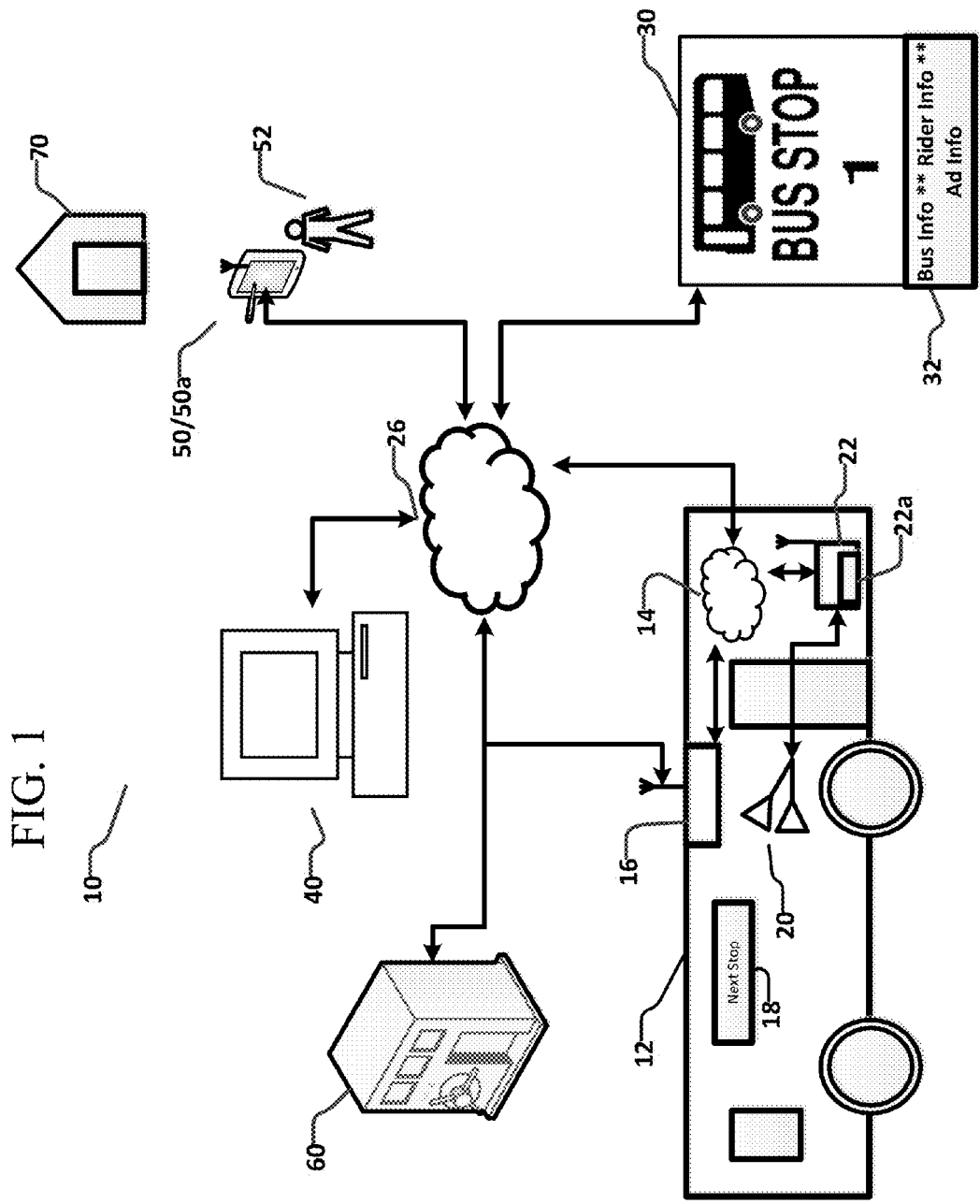
FIG. 1 is a diagram of a system for transit-rider-status identification and communication according to a non-limiting embodiment of the present invention.

FIG. 1 is a diagram of a system for transit-rider-status identification and communication comprising transit industry vehicle (TIV) 12, further comprising vehicle area network 14, router 16, next stop display 18, one or more TIV inputs/outputs (TIV IO) 20, and MDT 22, communication network 6, transit agency server 40, transit stop 30 and transit information sign 32.

Transit agency server 40 may be at a transit agency, and may have further systems that form part of the overall system enabling one or more forms of transportation for a transit agency. Transit agency server 40 may allow supervisors or schedulers to determine (such as via scheduling functions), staff (such as via the creation of runs and assigning drivers) and monitor (such as schedule adherence, vehicle safety and performance, and the like) routes, vehicles and other assets and aspects of a transit agency. Transit agency server 40 may be implemented via one or more software components (including applications and database components, for example), hardware components (including processors, RAM, ROM and the like), and may be used by one or more transit agencies or fleet operators.

Transit agencies may be agencies that have a transit network (generally a network of routes and coverage for the provision of transit services) and offer transit services. Transit networks may be definable via GPS coordinates, for example. Transit agencies may have registered demand-response riders and unregistered fixed route riders.

TIV 12 is a vehicle that provides, or relates to the provision of, transit services. TIV 12 may include buses, para-transit vehicles, maintenance vehicles, supervisory vehicles (such as cars or vans driven by supervisors) or a light rail/TRAM vehicles. TIV 12 has many systems running thereon, as known in the art, such as engines, brakes, audio announcement technology (such as transit stop announcements that may be displayed via next stop display 18 or announced via an audio announcement), signage, passenger counting, and the like (each a "TIV System", not shown).

MDT 22 is a computing device that may take TIV I/O 20 and user input (such as keystrokes, clicks, touch inputs, and the like) and provides the user interface to functionality relating to the provision of transit services. MDT 22 may often be located on TIV 12, but may be removable therefrom. Exemplary MDTs 22 include mobile phones, tablets, laptops (that may be running Windows™ or iOS™ operating systems, for example), ruggedized laptops, vendor specific MDTs (such as Android™. Blackberry™ or Apple™ products). Each of these combinations of vendor and product type (laptop versus smartphone for example) may be considered a hardware platform for MDT 22. Operators of TIV 12, or supervisors, may be some of the primary users of MDTs 22. MDT 22 may communicate with other elements of system 10 (such as transit agency server 40, TIV 12, transit stop or transit station, kiosks, ticketing locations, and the like, which may be referred to herein as transit agency elements), for example via communication network 26. MDTs 22 may have GPS units therein, allowing MDT's 22 GPS location to be determined (which may be referred to as an MDT GPS location).

MDT 22 may be operated by a driver of TIV 12. MDT 22 (such as via MDT-A 22a) may provide and/or allow a driver to provide the following functionality (noting that some of this functionality may be provided by RCD 50, or may be provided in conjunction with other elements of system 10):

(a) Receive an indication from one or more RCDs 50 that the RCD 50 is waiting to alight TIV 12 on which MDT 22 resides, possibly with a location (such as an address, GPS coordinates or a transit stop 30);

(b) Acknowledge, to one or more RCDs 50 that TIV 12 on which MDT 22 resides has received their communication and will pick them up;

(c) Communicate capacity information to rider 52 via RCD 50 (for example, in fixed route transit, indicating that the next street car on route 501 is full and rider 52 is likely going to have to take the next street car, hence they have another 7 minutes if they wish to purchase a coffee at a local store, presenting an advertising opportunity for coffee stores);

(d) Send information about TIV 12 to the RCD 50 that has indicated a rider is to be picked up, the information to help identify TIV 12 to rider 52 so that they alight the right TIV 12 (TIV identification information may include a TIV number, a picture of the operator of TIV 12, and the like);

(e) Send next stop information to both TIV signs 18 and to RCDs 50, for example that are located on TIV 12 via vehicle area network (VAN) 14 (or that are going to be taking TIV 12, via communication network 26);

(f) Provide a wake-up service for rider 52, for example by invoking features on RCD 50 or via MDT 22 reminding a driver of TIV 12 that a particular rider 52 is to get off at a stop;

(g) Facilitate arrival notices for riders 52 that have registered with MDT 22 and/or VAN 14:

(i) Provide transfer protection (knowing that rider 52 is to transfer at a next stop, prevent their next TIV 12 from departing that stop until rider 52 has alighted and/or registered with the subsequent TIV 12);

(ii) Notify interested parties of arrival times of riders 52 etc (for example, send messages to bosses, teachers, parents);

(h) Identify other riders 52 on TIV 12, for example that have indicated they can be "public" riders of TIV 12 (and not private), and that may have similar interests or reasons to be identified (ie single riders, riders in similar industries, and the like);

(i) Accept an indication from rider 52 that they wish to alight at the next stop (where such indication may be generated manually by rider 52 using RCD 50 or automatically by RCD 50 if RCD 50 knows the route the rider 52 wishes to travel);

(j) Perform turn-by-turn transit navigation for a rider's selected route, encompassing:

(i) Providing walking instructions, for example to get to transit stop 30, to get to transfer transit stop 30, and to get to a final destination, noting that when out of GPS coverage (such as at a station 60) WiFi networks and RFID networks forming part of station 60 may determine locations and provide instructions;

(ii) Providing transfer instructions, for example to get on the bus that is arriving, get off at the next stop, go to platform 3 to get the next train, and the like; and (k) Receive reports of damage on TIV 12, security events, and the like;

(l) Share transit-rider-status information with interested elements of system 10 (for example, if TIV 12 determines that rider 52 has alighted, it may share that status with transit agency server 40 if it has indicated it is interested in knowing. Alternatively transit agency server 40 or transit stop 30 may determine or receive a communication that RCD 50 has alighted TIV 12 and may be the first way that TIV 12 knows RCD 50 is on TIV 12, with TIV 12 being an interested party in such case. Whether transit agency server 40 is interested may depend on configurations of RCD 50, for example if rider 52 does not want to share their transit-rider-status or if they do not want any communication other than from TIV 12 then their transit-rider-status may not be shared by MDT 22. Similar considerations with respect to whether to share statuses may be performed by other elements of system 10.

MDT-A 22a is an application residing on MDT 22. MDT-A 22a largely controls MDT 22, including its operation and communication with other aspects of system 10. MDT-A 22a may be configured to present one or more screens (which may include output and input user interface elements) to a user of MDT 22, or otherwise accept or provide input or output (such as via sounds, vibrations, and the like) to enable to functionality described herein.

MDT 22 may communicate with TIV IO 20—such as by polling TIV IO 20 to "listen" for communications thereto or therefrom, and the like, and as known to those of skill in the art. Communication may be wired or wireless. Communication may allow TIV IO 20 to be controlled, monitored, and the like, such as by reading values associated with TIV IO 20, receiving statistics or system information therefrom, or setting values or otherwise controlling TIV IO 20.

Communication between TIV I/O 20 and MDT 22, may be wired (such as Ethernet, RS232 and the like) or wireless (such as infrared, Bluetooth™, WLAN, cellular, and the like) and may be via VAN 14 and/or router 16.

TIV IO 20 may be any inputs and/or outputs that communicate with, or form part of, any systems that are part of, or incorporated with, TIV 12. TIV IO 20 are able to communicate with other systems and/or computing devices, such as via wired or wireless communication paths or communication networks. TIV IO 20 may be wired into MDT 22 or intermediary hardware (not shown but that may then communicate with MDT 22) or may communicate wirelessly to one or more MDT 22. Exemplary TIV IO 20 may include an odometer, GPS, modem (for TDMA or CDMA communications), engine controllers, automated passenger counters (APC), American Disability Act (ADA) signs (such as next stop display 18) and head signs, fare collection systems, traffic signal priority (TSP) systems, audio and video systems, or discrete inputs (that may or may not be part of one or more of the above TIV IO). Discrete inputs may require an "on" or "off" signal, such as limit switches, selector switches or relay contacts. TIV IO 20 may have values (numeric, discrete, etc) that may be polled and set or controlled via MDT 22.

Communication network 26 may be substantially any public or private network, wired or wireless, and may be substantially comprised of one or more networks that may be able to facilitate communication between themselves. VAN 14 may be a form of communication network that exists on a vehicle such as TIV 12. Other than being geographically restricted (as it may extend only a certain distance from where a vehicle may be at a particular time), VAN 14 may be substantially similar to communication network 26. Router 16 may form part of VAN 14 and may allow WVLU 14a to communicate with it, so that communication can then continue. For example, router 16 may be a 4G router such that WVLU 14a may then communicate as widely as any cellular device, including to transit agency server 40 or vehicle 24.

Rider computing devices (RCD) 50 may be substantially any computing device (such as a tablet, mobile smart phone, laptop, etc) that allows a rider 52 to access and interact with system 10. RCD 50 may have one or more applications thereon, including a rider transit application (RTA) that may provide functionality relating to the transit services of one or more transit agencies (such as trip planning, schedule adherence information, ticketing and fare payment, and the like). RCD 50 may have GPS technology (to allow RCD 50 to obtain its GPS location, which may be a rider GPS location), camera technology, and other technology available on such devices. RCD 50 and rider 52 may be referred to somewhat interchangeably herein; generally a rider/RCD pairing (ie that a rider 52 will have a RCD 50 that they will carry and use to interact with system 10) will mean that such references apply.

RCD-A 50a is an application residing on RCD 22. RCD-A 22a largely controls RCD 22, including its operation and communication with other aspects of system 10. RCD-A 22a may be configured to present one or more screens (which may include output and input user interface elements) to a user of RCD 22, or otherwise accept or provide input or output (such as via sounds, vibrations, and the like), to enable to functionality described herein. RCD-A 50a may be a computer program product, comprising a computer usable medium and having a computer readable program code thereon adapted to perform the functionality as described herein.

Transit stop 30 may be a location where a rider may get on or off of TIV 12. Such may include stops, transfer locations, stations, and the like. Transit information sign 32 may be located at or near transit stop 30 and may display information relating to a transit agency's transit services, such as routes, route and schedule adherence, rider information, advertising information, and the like. Transit information sign 32 may be able to communicate with other elements of system 10, for example via communication network 26.

Transit station 60 may be a location where a rider may get on or off of TIV 12 and may transfer between TIV 12 and even between transit agencies. Transit station 60 may have one or more station signs that may be similar to transit information sign 32 and may be more sophisticated and complex. Transit station 60 may have one or more of its own WiFi networks that may be part of communication network 26. Transit station 60 may be able to communicate with other elements of system 10, for example via communication network 26. Transit station 60 may have areas that do not have coverage from mobile phone networks or GPS networks.

Figure 2:
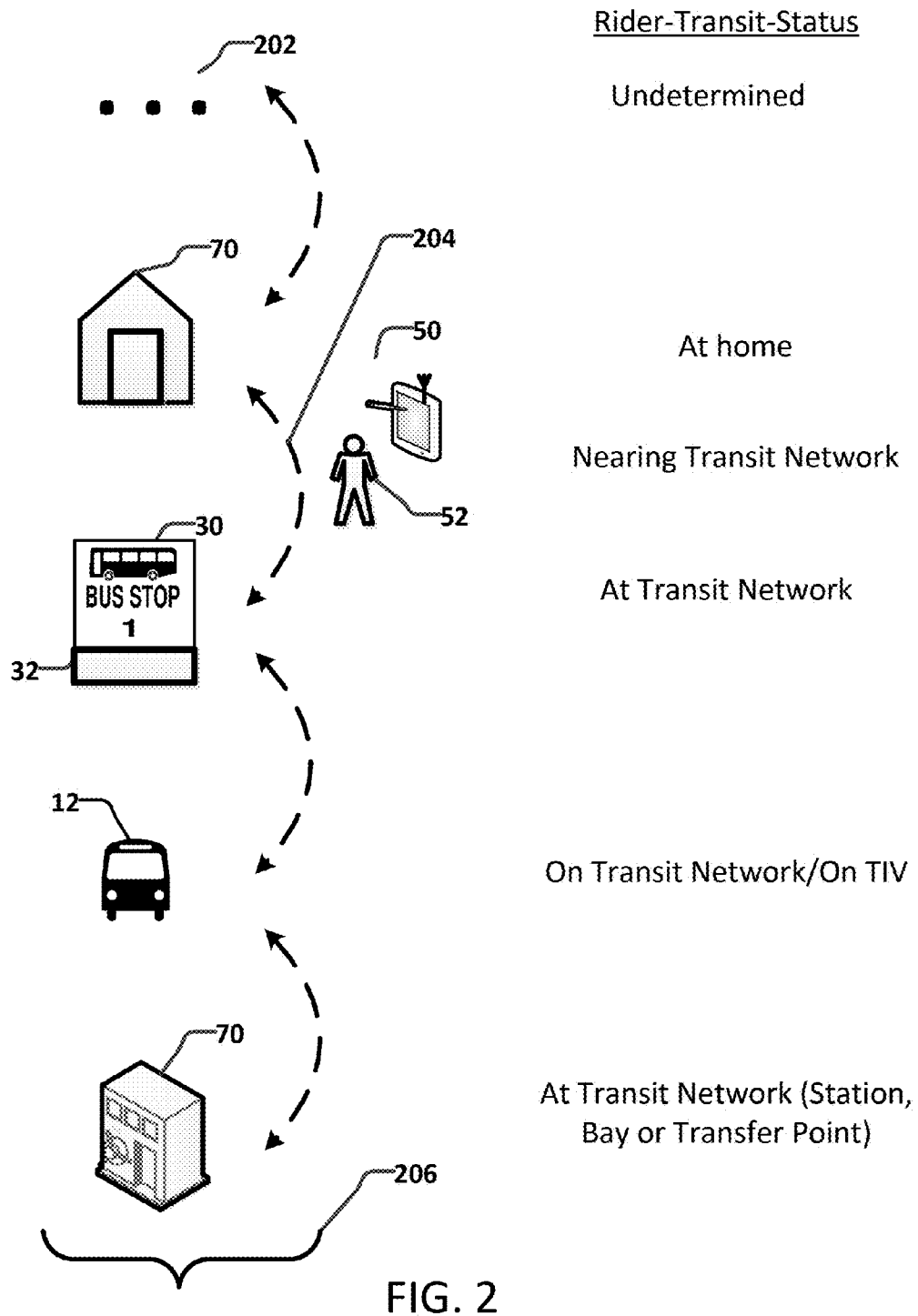
FIG. 2 is a diagram of statuses and locations for transit-rider-status identification and communication according to a non-limiting embodiment of the present invention.

FIG. 2 is a diagram of statuses and locations for transit-rider-status identification and communication.

Transit-rider-status is an identification of the status of a rider for a particular transit agency and/or transit network (noting that, as shown by other agency 202, each of these may be duplicated at different transit agencies and/or transit networks). Transit-rider-status describes how the rider 52 relates to or is involved with the transit agency or network at a particular point in time, and potentially (subject to configuration settings as described herein) at any point in time. Transit-rider-status allows each transit agency to be able to answer the question "where in the transit network is rider X?" at substantially any point in time (even if sometimes the answer is unknown, or rider X is not in the transit network). This is in contrast to a) demand response systems where a client may be known to be on a demand response vehicle, because an operator of the demand response vehicle has manually indicated such to an on-board computer, but if they are not on a demand response vehicle then their status is not known and b) where a rider can learn about the transit network but the transit network does not know much, if anything, about the rider or their status with respect to the transit network. These are examples of rider 52 knowing about the transit agency or transit network (which is not transit-rider-status) but of transit agency knowing about RCD 50 and hence rider 52.

Transit-rider-status may be determined via RCD 50 (ie either pushed from RCD 50 to system 10 or pulled from RCD 50 to system 10).

Rider 52 may have one or more transit-rider-statuses, for example for each transit agency that they have registered with (ie one in their home town and one where they work or have a second home). Transit-rider-status may be stored at transit server 40 for each rider 52 (and/or each RCD 50) and also stored on each RCD 50. Generally the transit-rider-status of a particular rider 52 will match between transit server 40 and RCD 50, though some synching may be required at times.

Transit-rider-status represents the status of rider 52 with respect to transit networks, transit services and transit agencies. It may not reflect the communication preferences that rider 52 may have, either generally or for a particular transit-rider-status. In other words, transit-rider-status is a status that does not depend on who rider 52 is. What occurs as a result of a particular transit-rider-status may be determined by riders 52 (and/or by other factors such as advertisers, transit agencies, communication networks 26, and the like).

Transit-rider-status may be determined manually or automatically. Whether transit-rider-status is determined manually, automatically, or both may be set as a configuration within RCD 50, such as by specifying "manual status mode", "automatic status mode" or "all status mode". Transit-rider-status may be determined via one or more indicators, and both manual transit-rider-status changes and automatic transit-rider-status updates may be via indicators (though automatic changes, as described herein may be based more on indicators as they may be inferences as opposed to direct 'manual' actions to indicate a particular transit-rider-status). Operation in the various modes may be, as described herein:

Manual mode: Either a transit agency (or its related parties such as schedulers, drivers, and the like) or rider 52 may manually update a transit-rider-status.
    Transit Agency: may manually update a rider's 52 status if their RCD 50 turns off, if RCD-A is stopped or exited;
    TIV driver: may manually update a rider's 52 status if rider 52 exits TIV 12 and their status is not updated automatically or quickly enough;
    Rider: may manually update their status to reflect their actual location/desire/goals, for example if automatic methods are not reflective, or if they do not want their status to be shared/monitored, for example.

Automatic mode: Rider 52 may allow RCD 50 to determine its transit-rider-status automatically be enabling such in configurations of RCD-A 50*a*. After setting the configuration to allow automatic status determination, the determination may be made, for example by:
    1) Comparing RCD's current GPS location to a list of known GPS coordinates indicating locations (ie a home location is stored on RCD 50, one or more transit stops 30 may be stored on RCD 50 or elsewhere in system 10, a route has a bunch of GPS coordinates, transit agency offices or kiosks, park-and-ride parking lots, etc, all of which may have known GPS coordinates or otherwise interact with RCD 50 so that a transit-rider-status can be determined);
    2) Detecting the presence of RCD 50 within range of VAN 26, optionally with one or more tests to ensure rider 52 is on TIV 12 and not just near it (for example an amount of time the presence is detected, presence detected at multiple GPS locations within a specified amount of time, and the like);
    3) Using one or more IP addresses of RCD 50 or being within short-range or local communication of one or more elements of system 10 (such as Bluetooth range, RFIP range, QR code or NFC range, and the like).

All mode: Rider 52 may allow RCD 50 to determine its transit-rider-status automatically or manually, as described herein.

Automatic methods of determining transit-rider-status may be via one or more rules (ie is RCD's GPS location within a defined distance from a known GPS location) and each rule may be checked periodically (for example, MDT 22 is to check its GPS location every 1 minute and compare that to a list of known, either locally on MDT 22 or via interacting with system 10, GPS locations). Each rule and each rule trigger (time or otherwise) may be separately defined and configured.

The diagram includes various locations (such as unknown or undetermined locations 202, rider home 70, on the way to a transit stop (depicted with line 204 which may be a leg), at a transit stop, onboard TIV 12, and at transit station 70).

It is to be understood that other intermediary locations may also be possible, such as between any of the locations herein.

Below is a table summarizing how various rider-transit-statuses may be determined:

| Rider-Transit-Status | Determination Method (assuming the mode is enabled) |
|---|---|
| Undefined - Undetermined - Off | Manual, for example:<br>    rider-input provided via RCD<br>    agency as RCD is not responding to polling<br>Automatic<br>    RCD powered off<br>    GPS signal not received by RCD<br>    GPS signal not within transit network range<br>    Mode selected causes undefined status |
| At Home | Manual, for example:<br>    rider-input provided via RCD<br>    agency/driver as rider 52 was just dropped off<br>Automatic<br>    GPS signal of RCD not within range of GPS coordinates of home location |
| Nearing Transit Network | Manual, for example:<br>    rider-input provided via RCD<br>Automatic<br>    GPS signal of RCD within range of GPS coordinates of path between known location (such as home) and transit stop (possibly in combination with other indicators such as rider 52 having recently planned a trip that fits with them Nearing Transit Network) |
| At Transit Network | Manual, for example:<br>    rider-input provided via RCD<br>Automatic<br>    GPS signal of RCD within range of GPS coordinates of transit stop 30<br>    agency as transit stop detects presence of rider 52 |
| On Transit Network (On TIV and In Site) | Manual, for example:<br>    rider-input provided via RCD<br>    agency/driver as rider 52 alights<br>Automatic<br>    RCD powered off<br>    GPS signal within range of TIV 12 GPS coordinates, within range of GPS coordinates of a transit station, or RFID or other sensor detection occurs |

The following are the communication modes that elements of the system, such as RCD 50 can operate in:

| Communication Mode | Communications Occurring |
|---|---|
| General/Permissive | A broad communication mode where any and all information may be provided to RCD 50, such as route information, ad information, transit network information, weather information, driver information, TIV 12 information, and the like. |
| Trip Focused (Multi-Trip) | A communication mode where communication only relates to one or more trips that may be taken (optionally where one is currently being taken), depending on timing (i.e. The 8:00 is looking good so tell me about that but now it is too late so start telling me about the next one automatically.) |
| Trip Focused (Single or Selected) | A communication mode where communication only relates to the trip that is i) to be taken, ii) is currently being taken, or iii) both. |
| Safety/Efficiency Focused | A communication mode where only safety and efficiency information is provided, such as weather issues, traffic problems, security incidents to avoid, and the like. |

The following table highlights some of the communication and services that may be provided to RCD 50. Some of these may be provided, calculated or determined by logic and data within RCD 50, from other elements of system 10, or some combination thereof. Of course the C&S provided to RCD 50 at any given time depends on several factors, including rider-transit-status, rider-transit-status determination mode, communication mode, communication methods available (ie RFID, WiFi, cellular, etc) and other configuration settings at RCD 50 (such as with respect to gamification, advertisements, etc) and transit agency (do they wish to broadcast social media updates, do they have advertisers, how much communication do they believe should be provided to riders). The following table provides brief descriptions of some of the C&S that may be described herein:

| Rider-Transit-Status | Communication and Services (C&S - which may be transit agency services and which may depend on communication mode selected as well) | C&S (transit agency services) Possibly Provided By |
|---|---|---|
| Undefined | Identifying the presence of a new transit network and asking whether rider 52 wishes to enable RCD-A | RCD 50 then transit agency server 40 |
| At Home/Work (or other fixed location for the individual) | need advance reminders (and/or taking into account the updates)<br>    For example rider 52 is eating breakfast and receives reminders that they need to leave as it generally takes 25 minutes to get to the bus stop or that their route has been cancelled with suggested alternate transit plan provided to me.<br>Route updates with suggested alternates when delayed or cancelled<br>    Rider can save their favourite bus stop(s) or trip plans in their profile and then select them from home or work before they leave to catch the bus (in one click one or more routes/trips can be monitored, and their updates and alternate routes may be automatically provided)<br>messages via email, SMS or app push<br>Need more general information for all options within a time range re: the status of service at my stop, for my trip plan (or set of plans that I may take as my day unfolds and my departure time approximation gets more accurate) | All may generally be provided by transit agency 40, possibly in combination with other elements of system 10 |
| Nearing Transit Network (via walking or driving or on a different TIV 12) | Provide information about the next few busses such as the status of each, what they look like, the load vs. capacity<br>Alert me as they approach<br>When will it arrive information including distance to stop<br>Provide additional information about the destination sign or TIV 12 headsign that may not be displayed on the headsign but is known by system 10 and MDT 22 (ie it is "Route 5 Downtown", but additionally MDT 22 indicates to rider 52 that it is "Via King" or "Via Main" and the like so the actual route downtown is more explicitly known). | Transit agency server, transit stop 30, and TIV 12 as they arrive<br>Transit agency server, transit stop 30, and TIV 12 as they arrive<br>Transit agency server, transit stop 30, and TIV 12 as they arrive |
| At Transit Network | See "Nearing Transit Network" (substantially similar to "Nearing Transit Network") | |
| On Transit Network (On Vehicle) | Next stop announcements (on RCD)<br>Transfer/arrival notices/estimate<br>    With transfer protection<br>    Encourages sign up (more people that the bus knows it should wait for the more likely it waits)<br>        Gamification<br>Wake me up alert, for when my stop is next<br>Notification of entering shopping district<br>Tell my teacher/boss/"interested party" rider 52 will be late (for example automatically)<br>    parents tracking children<br>View others users on bus/broadcast messages | |

-continued

| Rider-Transit-Status | Communication and Services (C&S - which may be transit agency services and which may depend on communication mode selected as well) | C&S (transit agency services) Possibly Provided By |
|---|---|---|
| | Amenities and transfer time at transfer points (it knows my next bus and that I have 15 minutes before I get on . . . and I speak Spanish and am in a wheelchair - what can I do at the next stop) Moving bus on map display shown on RCD 50 | |
| On Transit Network (At Building, etc) | Provide directions to exits, transfer points, and the like, optionally based on known route stored on RCD 50 for rider 52. | Transit agency server, transit stop 30 inside a site, RFID gateways or other short range or local communication elements, and TIV 12 as they arrive |

Figure 3:
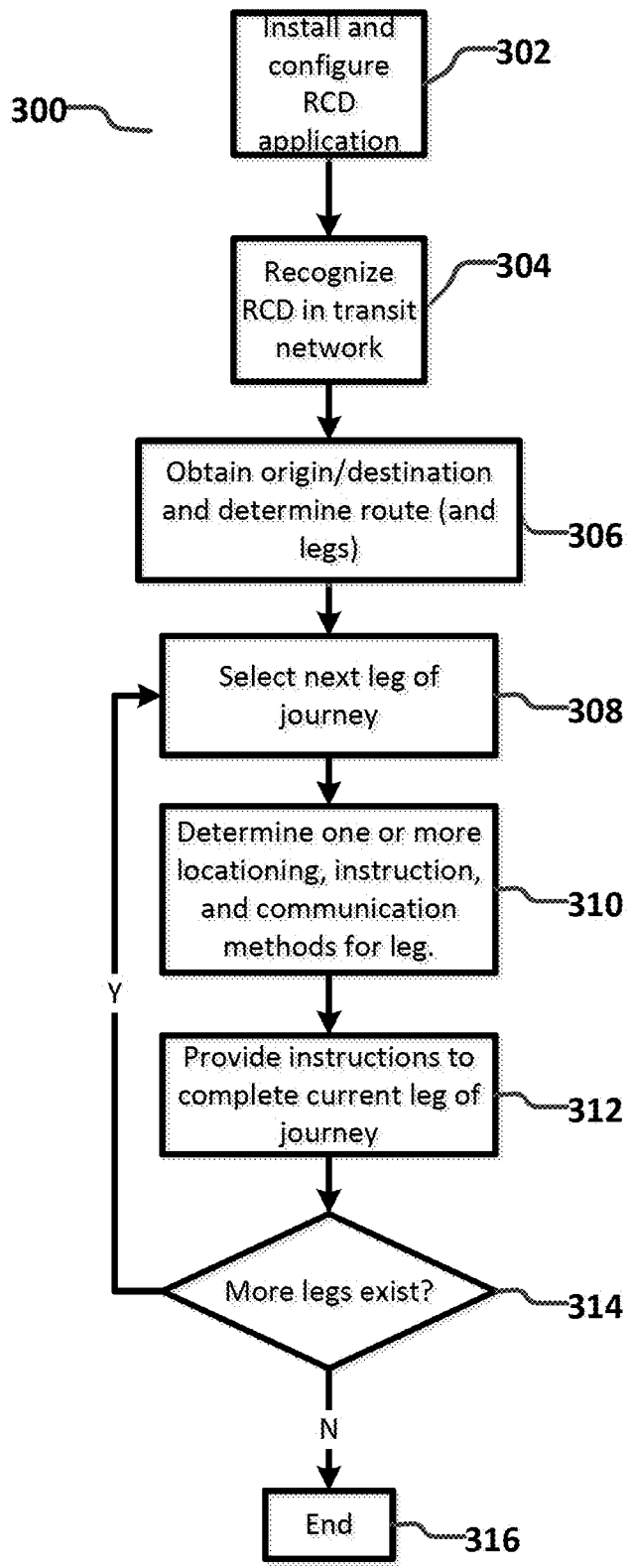
FIG. 3 is a method for transit-rider-status identification and communication on a transit industry vehicle according to a non-limiting embodiment of the present invention.

FIG. 3 is a method 300 for transit-rider-status identification and communication on a transit industry vehicle.

In effect, method 300 may be implemented to provide a transit-network turn by turn directions GPS solution that provides directions throughout rider's 52 trip, abstracting directions when they are not needed (for example when rider 52 is on TIV 12 and is thus not in control of following GPS directions) and providing directions (such as transit network directions) when applicable (such as when a debarking transit stop is being approached or when inside transit site 60 and GPS is not available).

Method 300 begins at 302 where RCD-A is installed and configured on RCD 50. Installation may be substantially as known to those of skill in the art and may be, for example, via an "application zone". Configurations may be substantially as described herein, and may include providing personal information, selecting communication preferences, and the like. Installation and configuration at 302 may be done well in advance of 302 and may be generally required in order to use the systems described herein.

At 304 RCD 50 may be recognized in a transit network. This may be done by RCD 50 allowing itself to be 'discoverable' by a transit agency and transit network. In practice RCD 50 may transit its GPS coordinates or other location identification to a known IP address or service, which may facilitate RCD 50 connecting with one or more transit agency servers 40. Alternatively RCD 50 may have a list of transit agency servers 40 that it may to be recognized by, with known addresses to communicate with in order to be recognized. Of course many alternatives also exist for an RCD 50 to be recognized as being in a transit network.

At 306 an origin and a destination are obtained, for a route that is to be followed/taken and a route is determined. Although many approaches are possible to 306, in one embodiment rider 52 enters their origin and destination, and that data (possibly along with RCD 50 current GPS coordinates) is provided to transit agency server 40 (and in particular a trip planning module, as is known to those of skill in the art). Transit agency server 40 may return to RCD 50 a route for the desired trip. A route may also be broken into one or more legs; each leg having a starting point and an ending point. Legs may generally be established each time a new mode of transportation is used during a trip (and may begin or end where a new mode of transportation is to occur, such as at a transit stop 30). For example, a route may require walking to a bus stop (leg 1), taking a bus (leg 2), getting off the bus and walking to a subway stop (leg 3) (optionally through a station, which may be a separate leg, for example leg 4, from walking to the station), getting off at another subway stop and walking to an office (leg 4).

At 308 a next leg of the trip is selected (beginning with a first leg). A route may be comprised of one or more legs.

At 310 a locationing method, instruction method, and communication method may be determined and instructions may be provided to arrive at the location to enter onto transit network.

As described herein, a locationing method may be any way that a user's location may be determined for a given point in time. This may include GPS, RFID, cellular, WiFi, and the like. The locationing method may have preferred methods based on, for example, cost of communication (ie cellular network may be the least accurate and most costly), transit-rider-status (ie if RCD 50 is on TIV 12 then WiFi via VAN 26 may be desirable and GPS may not be required), and accuracy (if GPS is available in transit site 60 but RFID is also available and more accurate for ensuring rider 52 is at the right stop when they are waiting then RFID may be employed).

The instruction method may involve determining how direction instructions are to be provided to rider 52 via RCD 50. This may include displaying them on a screen of RCD 50, providing tactile feedback, auditory commands, and the like. The direction instruction method may have preferred methods based on, for example, best likelihood of success (ie if no earphones are present then auditory may not be desirable, if rider 52 is not actively interacting with a screen or display of RCD 50 then visual may not be sufficient, etc).

The communication method may involve determining what network(s) or means to use to communicate information between transit agency server 40 and RCD 50 and may include all communication methods described herein. Similar to selecting a locationing method, the communication method may have preferred methods based on, for example, cost of communication (ie cellular network may be the least accurate and most costly), transit-rider-status (ie if RCD 50 is on TIV 12 then WiFi via VAN 26 may be desirable and GPS may not be required), and accuracy (if GPS is available in transit site 60 but RFID is also available and more accurate for ensuring rider 52 is at the right stop when they are waiting then RFID may be employed).

At 312 instructions are provided to complete the current leg of the route. The below table provides an overview of some of the instructions that may be required to complete a leg, based on the type of leg being considered:

| Leg Type | Communications Occurring | Preferred Communication Method |
|---|---|---|
| Walking - Open Air | Turn by turn instructions to get from start of leg to end of leg. | GPS |
| Walking - Station | Instructions to get from start of leg to end of leg. May include taking elevators, walking underground, taking internal trams/transfers within a station, and the like. | RFID (at station) instructions communicated to RCD 50 (for example via WiFi at transit agency server 40) Bluetooth, passenger scanned QR codes, NFC tags, and the like may also be used, and may be used for status updating |
| Walking - Transfer | May be similar to Walking - Station. Instructions to get from transit stop 30 that rider 52 disembarked vehicle at to transit stop 30 required for the next leg of a route. | RFID (at station, transit stops 30) instructions communicated to RCD 50 (for example via cellular communications, communications with transit stop 30) |
| On TIV 12 | Instructions for which TIV 12 to get on (ie confirming that the next TIV 12 at transit stop 30 you should get on), as described herein with respect to communications at transit stop 30. Instructions for which transit stop 30 to get off at, as described herein. Turn by turn not required. | WiFi (such as VAN 26a), Bluetooth, passenger scanned QR codes, NFC tags, and the like WiFi (such as VAN 26a), Bluetooth, passenger scanned QR codes, NFC tags, and the like |

At 314 a determination is made whether further legs exist for the route or whether the destination has been reached. If more exist then method 300 continues at 308 to address the next leg. Otherwise method 300 ends at 316.

Figure 4:
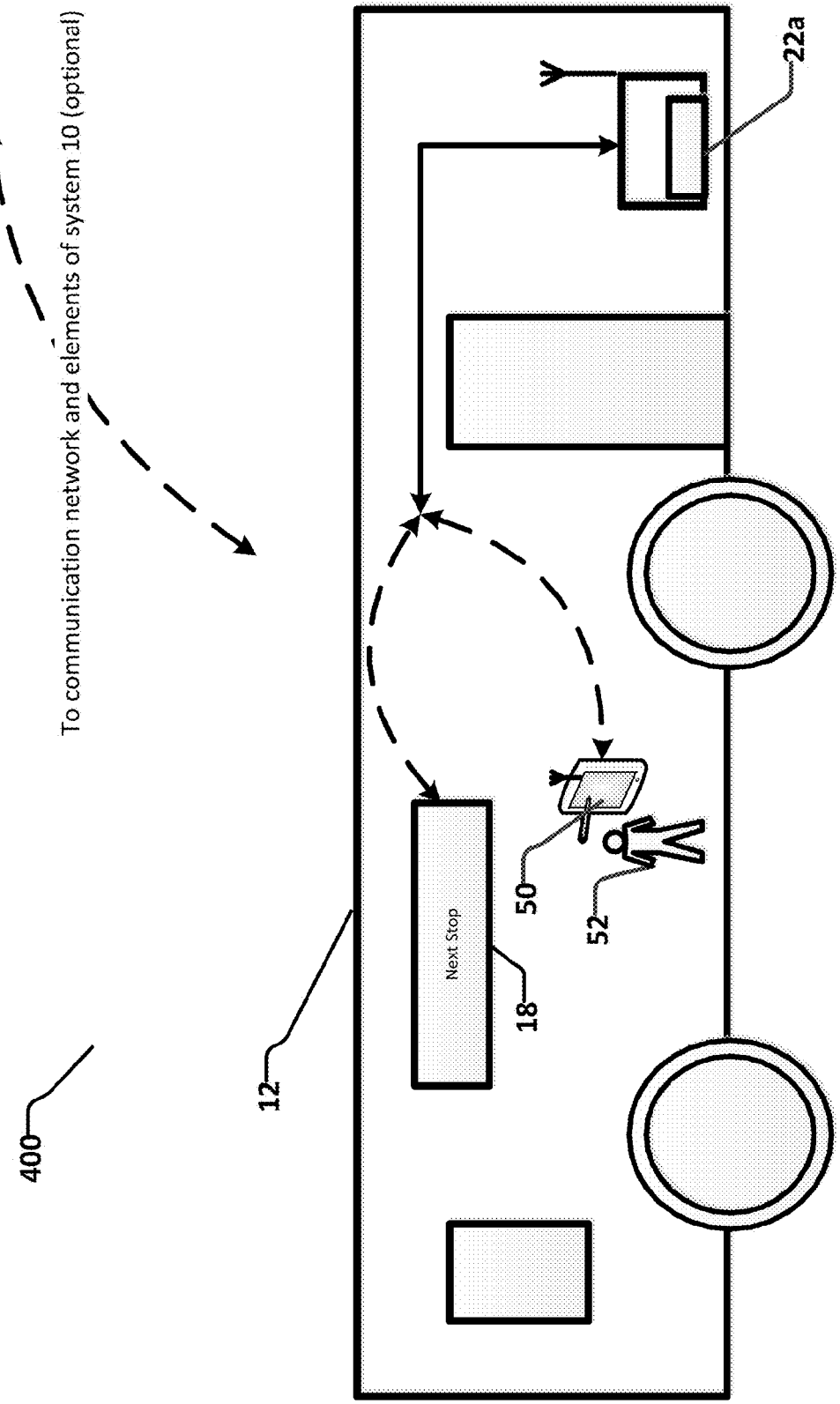
FIG. 4 is a diagram of a further system for transit-rider-status identification and communication on a transit industry vehicle according to a non-limiting embodiment of the present invention.

FIG. 4 is a diagram of a system 400 for transit-rider-status identification and communication on a transit industry vehicle.

System 400 may have substantially similar components to system 10. In operation, system 300 may involve rider 52 with RCD 50 alighting on (or being on) TIV 12. TIV 12 may be a fixed route bus with known stops in a known order, but without known passengers (except those practicing embodiments or aspects of the present invention). When rider 52 alights their RCD 50 registers its presence on TIV 12 and its transit-rider-status is updated to reflect it is on TIV 12. Registration may be for MDT 22 to add RCD 50 as a device with access to VAN 26, or as otherwise described herein, and may be via any form of local network (such as RFID, WiFi, Bluetooth and the like). Once registered, TIV 12 and RCD 50 may exchange communications and information. MDT 22 may be directing next stop announcements to next stop display 18 and/or to a speaker (not shown) for auditory announcements. At the same time, such next stop announcements may be directed to RCD-A so that they can be provided to rider 52 (such as via displaying on a screen of RCD 50—possibly even interrupting the currently used application on RCD 50—or via an auditory or vibratory alert. RCD 50 may provide route information (such as a route rider 52 is travelling on, as may have been determined by using trip planning modules, allowing MDT 22 to determine when the next stop is the stop RCD requires to follow its route) or other RCD data to MDT 22. Other information from MDT (MDT data or transit agency data or content) may also be provided to RCD 50, such as:

(a) Schedule adherence data for TIV 12—often provided to transit server 40, such as via 302, this data may help rider 52 determine if they are going to be late or on-time for their next stop (which may have implications for transfers or for events at their destination);

(b) Schedule adherence data for TIV 12 rider 52 is to transfer to—this schedule adherence data (for one or more other TIVs 12, for example that share transit stops 30 at which current TIV 12 is to stop at) may be received via MDT 22 or transit server 40 but if MDT 22 has such information then WiFi (VAN 26a of TIV 12) may be a preferred way to provide and distribute this data instead of potentially multiple RCD 50 having to incur cell costs instead of one cell communication with TIV 12 followed by multiple WiFi communications;

(c) Passenger counts—for example to know whether their friend will be able to get on at the next transit stop 30.

System 400 may also be used to maintain an updated register on MDT 22 (such as in a storage on MDT 22 accessed by MDT-A 22a) of RCDs 50 on TIV 12. Various triggers may indicate that MDT-A 22a should update or confirm its registered RCDs 50, such as when doors open, at each transit stop 30, after a certain distance or time, and the like.

Figure 5:
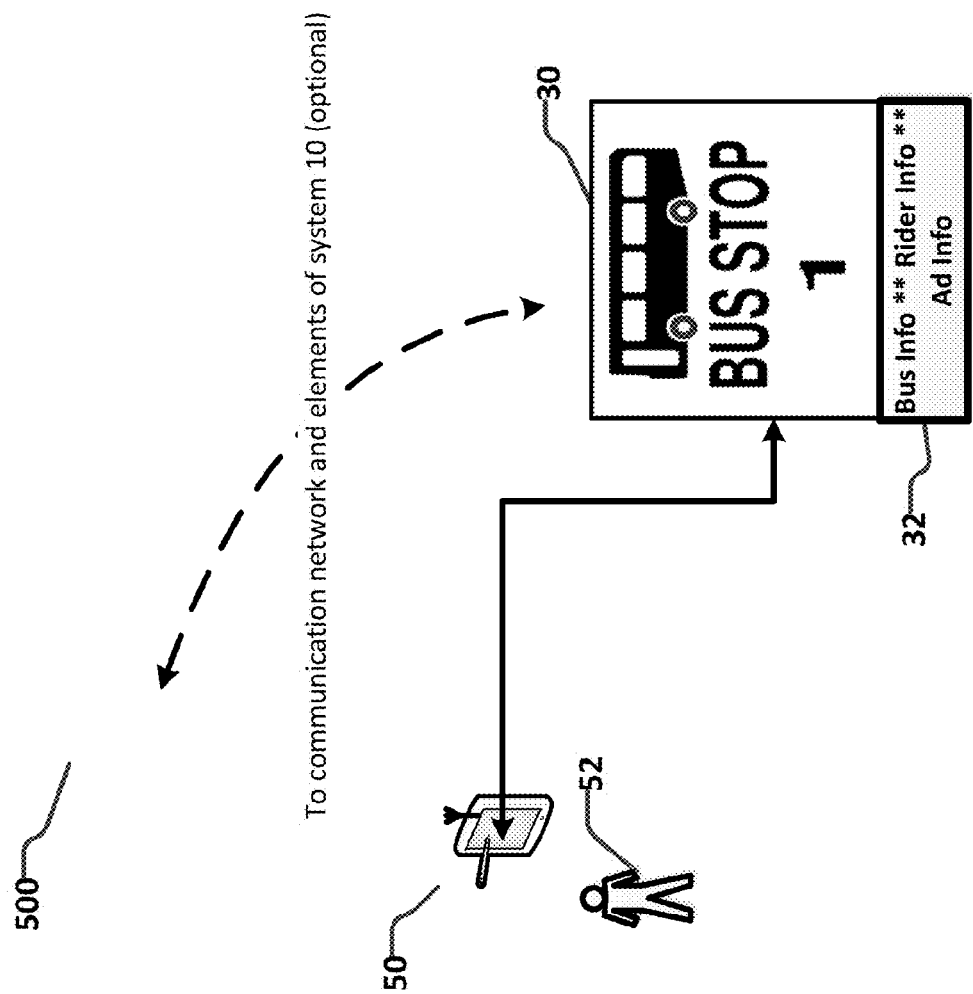
FIG. 5 is a diagram of a further system for transit-rider-status identification and communication on a transit industry vehicle according to a non-limiting embodiment of the present invention.

FIG. 5 is a diagram of a system 500 for transit-rider-status identification and communication on a transit industry vehicle.

System 500 may have substantially similar components to system 10. System 400 may highlight operation when rider 52 and hence RCD 50 are proximate to transit stop 30. In operation, system 400 may involve rider 52 with RCD 50 registering as being proximate to transit stop 30 (such as via RFID or some other form of registering). Transit stop 30 may then assist rider 52 in alighting on the proper TIV 12.

This may involve RCD 50 communicating which TIV 12 they should alight on based on their route, or providing their route to transit stop 30 (such that transit stop 30 may make such determination). This may further involve transit stop 30 communicating details about TIV 12 to RCD 50 (such as schedule adherence information that may be communicated to transit stop 30 or calculated by transit stop 30, or sending RCD 50 a picture of the driver of TIV 12 such that the picture may be displayed on RCD 50 in advance of TIV's 12 arrival at transit stop 30). Transit stop 30 may further provide a picture of itself, its address or other description (ie north west corner of King and Main, there are amenities such as washrooms or trashcans there, and the like), or suggest rider 52 play a game while waiting at transit stop 30 (possibly with some gamification such as transit stop 30 high scores, and the like). Transit stop 30 may also identify non-transit services that rider 52 may have time to access before they must alight (such as getting a coffee, optionally even integrating with pick-up order systems of local restaurants or other service providers) and transit stop 30 may tell TIV 12 to wait if a rider has registered and then indicated they are going to take advantage of a local service prior to alighting.

It will be apparent to one of skill in the art that other configurations, hardware etc may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

What is claimed is:

1. A transit system for communication between one or more transit users and one or more transit agency elements of one or more transit agencies, where such communication is determined by transit-rider-status and where transit agency elements comprise transit industry vehicles, transit stops, and transit agency servers, the system comprising:
   one or more transit agency servers for one or more transit agencies configured to:
      receive one or more transit-rider-status indicators;
      determine a transit-rider-status for each of the one or more transit users;
      exchange the transit-rider-status and other transit data with one or more interested elements; and
      communicate with and provide transit agency services to one or more user computing devices; and
   one or more mobile data terminals each located on a transit industry vehicle, each configured to:
      receive one or more transit-rider-status indicators from one or more rider communication devices;
      determine a transit-rider-status for each of the one or more transit users;
      exchange the transit-rider-status and other transit data with one or more interested elements; and
      communicate with and provide transit agency services to the one or more rider computing devices.

2. A computer program product, comprising a computer usable medium having a non-transitory computer readable program code adapted to be executed on a rider communication device (RCD) of a rider to cause the rider communication device to register and communicate with a mobile data terminal (MDT) of a transit vehicle the method comprising:
   registering the RCD with the MDT of the transit vehicle;
   establishing what communications are to occur between the MDT and the RCD;
   providing, by the RCD to the MDT, rider communication device data; and
   receiving, by the RCD from the MDT, mobile data terminal data.

3. The computer program product of claim 2 wherein the rider communication device data is a route being taken by the rider, such route including one or more legs where a current leg is performed by the transit industry vehicle, and the current leg having an endpoint that is a transit stop for the transit industry vehicle, and wherein the mobile data terminal data is a next stop announcement when a next stop of transit vehicle is the endpoint.

4. The computer program product of claim 3 wherein the registering further comprises ensuring the RCD is travelling on the MDT.

5. The computer program product of claim 4 wherein the ensuring is via comparing a rider GPS location to a mobile data terminal GPS location.

* * * * *